United States Patent [19]
Goldstein et al.

[11] Patent Number: 5,755,987
[45] Date of Patent: May 26, 1998

[54] DIBASIC ESTER BASED PHASE CHANGE MATERIAL COMPOSITIONS

[75] Inventors: Avery N. Goldstein, Oak Park; George A. Lane, Midland, both of Mich.

[73] Assignee: The Dow Chemical Company, Midland, Mich.

[21] Appl. No.: 702,820

[22] Filed: Aug. 23, 1996

[51] Int. Cl.$^6$ ................................................ C09K 5/06
[52] U.S. Cl. ........................ 252/70; 126/619; 165/104.21
[58] Field of Search ............................ 252/70; 126/619; 165/104.17, 104.21

[56] References Cited

U.S. PATENT DOCUMENTS

| | | | |
|---|---|---|---|
| 3,956,153 | 5/1976 | Chadla | 252/67 |
| 4,309,297 | 1/1982 | Sato et al. | 252/70 |
| 4,400,287 | 8/1983 | Kimura et al. | 252/70 |
| 4,412,930 | 11/1983 | Koike et al. | 252/70 |
| 4,532,917 | 8/1985 | Taff et al. | 126/430 |
| 4,572,864 | 2/1986 | Benson et al. | 428/305.5 |
| 4,717,494 | 1/1988 | Itatawi et al. | 252/70 |
| 5,211,949 | 5/1993 | Salyer | 252/70 |
| 5,282,994 | 2/1994 | Salyer | 252/70 |
| 5,565,132 | 10/1996 | Salyer | 252/70 |

*Primary Examiner*—Gary P. Straub

[57] ABSTRACT

A family of organic compounds with chemical properties that make them suitable for use as phase change materials (PCMs), comprising, esters of dibasic acids are disclosed. These materials have high latent heats of fusion, low flammability, low miscibility with water, low cost, availability and a range of melting temperatures. The PCMs of the invention may be enclosed in a single, non-compartmentalized container with immiscible phase change material substances to moderate the temperature of a body between that of the melting temperatures of the PCMs.

18 Claims, No Drawings

DIBASIC ESTER BASED PHASE CHANGE MATERIAL COMPOSITIONS

FIELD OF THE INVENTION

The invention relates to organic phase change materials suitable for maintaining systems at predetermined temperatures.

BACKGROUND OF THE INVENTION

Renewed interest in space heating and cooling, energy recovery and utility load leveling has resulted in a revival of energy storage research and development. The traditional sensible heat storage media—rock beds, water tanks, brick recuperators, and the like—may be replaced advantageously with phase change materials, which have a higher heat storage capacity and supply heat isothermally. For the purposes of this invention, a material that changes in heat content upon undergoing a reversible phase transformation is defined as a phase change material (PCM). The field of PCM thermal energy storage is summarized in Solar Heat Storage: Latent Heat Materials, Vol. I-II, Ed. G. A. Lane, CRC Press, Boca Raton, Fla., (1983 and 1986), which are incorporated herein by reference.

A PCM, synonymously known as a latent thermal energy storage material, is used for thermal energy storage. A PCM may be used to heat or cool a given system depending on its melting temperature relative to the system. In practice, PCMs with desirable liquid-solid transformation properties are employed due to the ease of containing condensed phase materials. The absorption of the necessary quantity of energy by the solid PCM results in melting. The energy absorbed by the PCM to change phase at its characteristic melting temperature is known as the latent heat of fusion. The latent heat of fusion stored in the liquid state is released upon resolidification.

Because the solid-liquid phase transformation of a PCM is reversible, thermal energy may be efficiently transferred between two thermal environments, one at a higher and the other at a lower temperature than the melting temperature of the PCM. The net result is that the higher temperature environment decreases in heat content, while the lower temperature environment gains a comparable amount of heat. A PCM allows for the heat transfer to be delayed in time, such that excess heat may be absorbed from a system and later returned to the same or a different system when the temperature is below the PCM melting temperature. An instance where a PCM may serve to moderate temperature within a single system is a building, wherein air conditioning may be required during the day to compensate for excess heat absorbed through solar radiation, and heating may be required at night to compensate for the dissipation of heat to the surroundings.

The thermal profile associated with a PCM lessening in energy content consists of a decrease in temperature as the liquid PCM releases sensible heat until reaching its melting temperature; followed by a thermal plateau which is maintained until all the material is solidified, at which point the solidified PCM has released its latent heat of fusion and thereafter sensible heat release from the solid follows until equilibrium at ambient temperature is attained. Sensible heat is defined as the thermal energy absorbed or released by a material through a change in temperature, but without undergoing a phase transformation. Sensible heat storage typically requires far larger quantities of material than PCMs to store a given quantity of thermal energy in the temperature range encompassing the PCM melting temperature. In addition, sensible heat storage materials do not maintain a thermal plateau associated with the co-existence of both solid and liquid in a PCM during phase transformation.

Efficient PCMs generally share several common thermochemical properties including high latent heat of fusion, high thermal conductivity and the ability to cycle thermally without degradation. Further reduction in the number of viable PCMs occurs when one considers the additional criteria of melting temperature, density, packaging, toxicity and cost. The net result of these limitations is that there are few PCM systems suitable for operation below about 55° C.

Ice, the traditional cooling material, possesses nearly all the properties of an optimum PCM-low cost, abundant, available, exceptionally high heat of fusion, good thermal conductivity, non-toxic, non-flammable, chemical and physical stability, and non-corrosive. The deficiencies inherent in ice as a PCM are low density, expansion during freezing, and lower than ideal freezing point.

The expansion of ice during freezing may be destructive to the containment vessel. This effect may be counteracted with mechanical devices, e.g., cube freezer with storage bin, or partial freezing schemes. These mechanical solutions add to the cost of the system and reduce storage capacity.

In order to freeze water at a workable rate, the heat exchange surface must be at $-10°$ to $-5°$ C., requiring the chiller to cool the heat transfer fluid to these temperatures. Cooling the heat transfer fluid to operate at or below this temperature range is an energy intensive process that requires complex mechanical equipment. The resulting discharge, or melting cycle then provides fluid at $+5°$ to $+10°$ C. to cool a desired space. It is advantageous to have a PCM that freezes at a temperature above that of ice to increase energy efficiency and prolong mechanical equipment lifetime. Alternatively, a PCM melting at 5° C. may be charged at a workable rate by fluid at $-5°$ to 0° C., and a PCM melting at 10° C. by a fluid at 0 to 5° C. The discharge would operate at $+10°$ to $+15°$ C. This increase of 5°–10° C. in chiller operating temperature has an advantageous effect on chiller efficiency and cost. A partially or completely passive building thermal regulation system may be constructed from a PCM with a melting temperature in the range of 5°–35° C. for uses in climates, such as deserts which have extremes of temperature within a daily cycle that requires both heating and cooling. In such instances, the PCM dissipates heat and absorbs heat within the building, in the course of the cold and hot portion of the day, respectively with a concurrent change of phase.

Prior art hydrate-based PCMs, polyols and hydrophilic organics used for cooling systems all tend to absorb water from the surroundings depending on the ambient relative humidity, thereby changing in composition and melting properties, if exposed to the atmosphere. This presents packaging and formulation difficulties. During processing of these PCMs, care must be taken to assure that the material is not in contact with excessively humid or inordinately dry air long enough to change the water content substantially. Containment of such systems over an acceptable service lifetime is a challenging problem. The container must be hermetically sealed, and of very low permeability to water vapor. In this regard, metal containers are usually satisfactory, provided the PCM does not corrode the container. Corrosion of metallic containers, especially by salt hydrate PCMs is a serious concern. Plastic containers must be thick-walled enough that water vapor transport through the container wall is negligible over the life of the heat storage system. As a result, the cost of packaging a PCM is often several times that of the material itself.

SUMMARY OF THE INVENTION

This invention is a process for reversibly controlling the temperature of a body comprising the step of: contacting said body with a closed container enclosing a phase change material comprising a dibasic ester of the formula ROOC—$(CH_2)_n$—COOR', wherein R is a group containing $C_{1-8}$, R' is a group containing $C_{1-8}$ and n is a number from 2 to 10, whereby the temperature of said body is controlled within a predetermined temperature range. The phase change material absorbs thermal energy from said body at a higher temperature than the phase change material, until the phase change material undergoes a reversible melt. The molten phase change material transfers thermal energy to a second body and thereby undergoes a reversible freeze. Compounds that are miscible and unreactive towards dibasic esters are optionally added to the phase change material. These include an alcohol of the formula R"OH, wherein R" is selected from the group consisting of: an aliphatic of less than 20 carbon atoms, an aryl of less than 18 carbon atoms optionally substituted with at least one $C_{1-4}$ containing group; water; a carboxylic acid having a pKa value of greater than about 10; and a polymeric material having a molecular weight of less than about 5000.

The phase change materials comprising dibasic esters have several advantages which make them particularly useful as PCMs. They melt without significant phase segregation, have low vapor pressures, often do not require nucleating agents and may be formulated over a broad range of temperatures.

This invention further details a process for moderating the temperature of a body between the melting temperatures of a multiplicity of phase change materials comprising the step of: contacting said body with a non-compartmentalized container enclosing at least two phase change materials, a first phase change material comprising a dibasic ester comprising a dibasic ester of the formula ROOC—$(CH_2)_n$—COOR', wherein R is a group containing $C_{1-8}$, R' is a group containing $C_{1-8}$ and n is a number from 2 to 10; a second phase change material wherein a meniscus forms between said first said second phase change materials, whereby the temperature of said body is controlled within a predetermined temperature range.

DETAILED DESCRIPTION OF THE INVENTION

The dibasic esters are defined herein to include compounds of the formula ROOC—$(CH_2)_n$—COOR', wherein n is an integer number between 0 and 8; and R and R' are alkyl or alkenyl groups containing from 1 to 8 carbon atoms. R and R' may be identical or different groups within the same dibasic ester molecule. It is preferred that the R and R' be identical. It is further preferred that R and R' both be alkyl.

The low mutual solubility between the dibasic esters and water is advantageous in that the container enclosing the PCM need not be as rigorously closed. Transpiration of water vapor from the atmosphere into the container of the instant invention does not have the negative effects on PCM properties associated with glycol- and salt hydrate-based PCMs. The less stringent packaging requirements associated with the dibasic esters lower the unit cost of the PCM system.

The dibasic esters tend to have lower vapor pressures and higher condensed phase densities than many other like sized organic molecules. The lower vapor pressures and high densities have benefits in packaging the PCM. The low vapor pressures are also largely responsible for the high flashpoints associated with the dibasic esters, relative to like sized organics. The flashpoints of the dibasic esters are typically above 350° C. The high flashpoints provide an important safety advantage.

Generically, the specific gravities of the dibasic esters range from about 0.90 to about 1.2 at 20° C. Similarly, the vapor pressures of the dibasic esters is generically less than about 5 torr at 20° C. The high densities of dibasic acids, as compared to other organic compounds, mean that a smaller volume of PCM is needed to store a amount of thermal energy, resulting in a smaller PCM container.

The melting temperature of a PCM constituent is an important feature in selecting it for a particular application. The position of stable multi-component eutectics and other features within the phase diagrams derive from the melting temperatures of the PCM constituents. The melting temperatures of some representative dibasic esters are highlighted in Table 1.

TABLE 1

Melting Temperatures of Some Representative Dibasic Acid Esters, ROOC—$(CH_2)_n$—COOR.

| Name | n | Melting Temp., °C. Dimethyl | Melting Temp., °C. Diethyl |
|---|---|---|---|
| Oxalate | 0 | 54 | −38 |
| Malonate | 1 | −62 | −50 |
| Succinate | 2 | 17 | −20 |
| Glutarate | 3 | −43 | −24 |
| Adipate | 4 | 10 | −20 |
| Pimelate | 5 | −21 | −24 |
| Suberate | 6 | −3 | 6 |
| Azelate | 7 |  | −18 |
| Sebacate | 8 | 38 | 5 |

Many alcohols, carboxylic acids and polymers are miscible with the dibasic esters over a wide range of compositions. Thus, these miscible compounds may be added to dibasic esters to form PCMs with a variety of modified properties including melting temperatures, heats of fusions, vapor pressures and the like. Miscibility is defined herein to mean that two or more liquid compounds mix to the extent that a meniscus is not observed between the two or more liquids.

Alcohols of the form R"OH wherein R" may be an aliphatic of less than 20 carbon atoms, or an aryl of less than 18 carbon atoms, optionally substituted with at least one group containing one to four carbon atoms are also suitable PCM constituents, provided they be miscible with the dibasic ester over the compositional and temperature range in which the PCM operates. It is preferred that the alcohols be linear, since the molar heat of fusion of a linear alcohol exceeds that of its branched analogs. It is further preferred that the alcohol be saturated (i.e. alkyl).

The dibasic esters are only miscible with water to a limited extent, but may still perform as a suitable PCM constituent. For example, water is soluble in dimethyl adipate to 2.4 weight percent, based on total weight at 20° C. Exceeding 2.4 percent water results in a layer of excess water floating on the dimethyl adipate. At the solubility limit, two liquid phases (water and the DMA-water eutectic) and a solid (the DMA-water) are in equilibrium and the phase system is invariant. With invariant endpoints for the compositions of pure dimethyl adipate and the solubility limit of water in dimethyl adipate, an intermediate endpoint is assured. The water-phenol phase diagram is a well known example of this type of partial miscibility system and is described by Campbell et al. in J. Am. Chem. Soc. 59, 2481 (1937). A eutectic is observed in the water-dimethyl adipate phase diagram at about 2.0 weight percent water based on total PCM weight with a melting temperature of 6.6° C., versus about 10.3° C. for pure dimethyl adipate. The heat of fusion is about that of pure dimethyl adipate, namely 38 cal/g.

The carboxylic acids which are operative as PCM constituents in the instant invention are those which are miscible with the dibasic ester and are not reactive towards the dibasic ester. The carboxylic acids with pKa values of greater than 10 satisfy these requirements. These acids include both monobasic and dibasic acids. Monobasic acids adapted for use in the instant invention include, but are not limited to: decanoic, lauric, myristic, palmitic, stearic, oleic, linoleic and linolenic acids. Dibasic acids adapted for use in the instant invention include glutaric, adipic, pimelic, malonic, fumaric, phthalic, isophthalic, suberic, azelaic, sebacic, and undecanedioic. It is preferred that the acid constituents of a PCM be linear molecules. It is further preferred that the acids be saturated (i.e. alkyl).

Oxygen containing polymeric species of a molecular weight of less than 5000, such as polyglycols, poly (tetrahydrofuran), polyacrylic acid, polybutadiene diol and polyols, all tend to be miscible with the dibasic esters. For example, dimethyl succinate forms a PCM with 900 average molecular weight polyethylene glycol. A euctectic is observed with 60 weight percent dimethyl succinate based on total weight percent, with a melting temperature of 12.6° C. Polymeric constituents are generally not preferred as major (>10 weight percent) constituent of PCMs within the instant invention because the polymers' heat of fusion on a weight basis tend to be lower than that for the dibasic esters or other constituents detailed herein. In addition, the variations in polymer chain length lead to gradually changing freeze curve, owing to different length chains freezing at different temperatures. The longer the chain length the more pronounced these deficiencies become. There are nonetheless applications for PCMs of the instant invention wherein the cost and viscosity of polymeric constituents are an advantage.

A further advantage of the class of PCMs detailed herein is that nucleating agents are often not required. The dibasic esters tend to crystallize readily upon attaining the freezing temperature. In contrast, most salt hydrate based PCMs are kinetically slow to form nuclei about which crystals of the freezing PCM grow. The slow nucleation means that these compounds tend to supercool. A nucleating agent is typically added to a material to facilitate crystal nucleation, in order to diminish supercooling.

The method of finding a PCM composition with predetermined melting characteristics involves measuring the time-temperature thermal profile during freezing or melting. Upon measuring the thermal profile of a pure compound, a known aliquot of another miscible compound is added and a new thermal profile is collected. This process is repeated to construct a phase diagram of the system, with special interest the eutectic compositions. At a eutectic composition the relative percentage of each constituent is the same in both the liquid and solid phases and the mixture melts as if a single, pure compound.

Upon testing various compositions of acids until a composition is found with the desired melting-freezing properties, the dibasic ester containing PCM is placed in a container. The "charged" state of the PCM is dictated by the application. To add heat to a thermal body the PCM is molten in the "charged" state; whereas, to absorb heat from a thermal body and thereby cool the body the PCM must be solid to be effective. The freezing temperature of the PCM must be higher than the temperature of thermal body to add latent heat to it. The melting temperature must be lower than the temperature of the thermal body to absorb latent heat.

A PCM in the solid phase is exposed to a thermal source of a temperature greater than the PCM melting temperature in order to absorb heat from the thermal source and thereby cool the source. The thermal source may be: room air, a combustion exhaust stream, an exothermic chemical reaction, cooling fluid effluent or the like; a source of passive energy such as solar energy; or an active source of thermal energy such as a resistively heated element or microwave energy. For the purposes of this invention, heat sources such as these, as well as heat sinks which absorb heat from a PCM are referred to using the shorthand term "body" or "bodies". The solid PCM absorbs energy first to raise the solid to its melting temperature, then an amount of energy equivalent to its latent heat of fusion in melting and lastly, additional sensible heat as the temperature of the now liquid PCM increases above the melting temperature. The PCM maintains a near uniform temperature while solid and liquid co-exist. The uniform temperature over this range of thermal absorption is the basis for the use of PCMs to moderate thermal variations in climate control, chemical reactions, electronics packing, and the like. Thus, in many applications it is advantageous not to fully melt the PCM.

The molten PCM freezes upon removing the thermal source exposure, and exposing the container with the PCM to an environment at a temperature less than the melting temperature of the PCM. The energy absorbed in the process of the PCM melting is now reversibly released into the environment. Sensible heat storage within a PCM may be made comparable to that stored in the PCM as latent heat of fusion, but at the cost of not being stored isothermally. Furthermore, excessive heating of the molten PCM in order to store increasing amounts of sensible heat may degrade the PCM. For these reasons, it is a preferred embodiment that the maximal temperature of a PCM not be raised to beyond a point where the sensible heat storage in the liquid PCM is greater than twice that stored as latent heat of fusion.

The process of exposing the PCM container to a thermal source then releasing the energy absorbed into an environment is a reversible process in the instant invention and may be cycled repeatedly.

The container in which the PCM is enclosed is able to tolerate the seepage of outside air into the container, since the dibasic esters of the instant invention are largely immiscible with water vapor, as would be found in atmospheric air. Immiscible is defined as forming a meniscus between liquid substances upon layering one upon the other. Because it is not required that atmospheric air be excluded from the PCM, a variety of substances are adapted for containing the PCMs of the instant invention. These materials include: metal, plastic, ceramic, siliceous, cellulosic, natural fiber, artificial fiber, concrete, gypsum, rock and mixtures thereof. The low vapor pressures of the esters also mean that an unsealed container of PCM will not readily evaporate.

The immiscibility of the PCMs of the instant invention with water may be further exploited to contain different PCMs within the same container. The use of a single PCM container simplifies the thermal regulation system, in that it removes the necessity of having separate encapsulations for each PCM store, saves on separate insulation for each tank, and may simplify the operation of the system by reducing control complexity. For instance, a salt hydrate like calcium chloride hexahydrate with a melting temperature of about 27° C. and a specific gravity of 1.71 is immiscible with PCMs based on esters such as the aforementioned dimethyl adipate and dimethyl succinate. The ester based PCMs, owing to lower specific gravity than the salt hydrates, floats on top. Thus, two PCMs are stored in the same container and passively maintain the temperature within the bracketed range. It is preferred that the PCMs be chosen to include the desired range temperature of a system, so deviations from that temperature are suppressed by the molten PCM freezing or the second frozen PCM melting. The only limitation on the identity of the non-ester PCM is that it be immiscible and be of a melting temperature at which the instant invention PCM is not volatilized or degraded. Useful non-ester PCMs which may successfully be layered in a single container with the PCMs of the instant invention illustratively include: water, calcium chloride hexahydrate, magnesium chloride hexahydrate, calcium bromide hexahydrate, magnesium nitrate hexahydrate and eutectics formed by combining the listed salt hydrates.

It is understood that additional components other than those disclosed herein may be used in conjunction with PCMs comprising mixtures of dibasic esters, in order to vary the PCM properties without departing from the spirit of the invention. The following examples disclose specific, illustrative PCM compositions of the present invention, which are not intended to limit the scope of the invention.

EXAMPLE 1

The temperature of a sample is measured as a function of time as it cooled in a dry ice-isopropanol bath maintained at a constant temperature of −78.5° C. The sample contains about 60 g of dimethyl adipate, which has a melting temperature of 10° C. and varying amounts of ethanol, which has a melting temperature of −117° C. The sample is enclosed in a 120 ml bottle and sealed with a screw cap. The cap is fitted with a thermocouple well, made of a glass capillary permanently affixed in a hole bored through the center of the cap. A J-type thermocouple is inserted into the capillary and positioned in the center of the sample volume. Ethanol is added in amounts to systematically increase the weight percentage of ethanol in the total sample. For compositions melting above 0° C., dystetics are noted at compositions corresponding to molecular formulas: $(DMA)_4(EtOH)$, (about 94 percent DMA, 6 percent EtOH); $(DMA)_5(EtOH)_2$, (about 90 percent DMA, 10 percent EtOH); and $(DMA)_5(EtOH)_3$, (about 86 percent DMA, 14 percent EtOH); where DMA is dimethyl adipate and EtOH is ethanol. Adjacent to these dystetics, eutectic compositions are observed at about 95 weight percent DMA, 4.5° C.; about 92 weight percent DMA, 3.2° C.; and 89 weight percent, 3.0° C. wherein the weight percentages are based on total sample weight. One kilogram (kg) of PCM containing 96 weight percent DMA, 4 weight percent ethanol based on total weight is sealed in a polyethylene bottle and placed in a conventional electric freezer until solidified. The polyethylene bottle is placed in an insulated box with perishable fresh cut flowers. The flowers are maintained at about 5° C. for several hours.

EXAMPLE 2

The dibasic ester, dimethyl adipate (DMA) with a melting temperature of 10° C. is combined in percentages ranging from 0 to 100 weight percent with 1-octanol which has a melting temperature of −16° C. The thermal profiles of these various compositions are studied using the methods of Example 1. Eutectics are observed at about 80 weight percent DMA, 5.4° C.; about 67 weight percent DMA, 4.8° C.; and about 47 weight percent DMA, 3.9° C. wherein the weight percentages are based on total sample weight. 790 grams (g) of PCM containing 68 weight percent DMA, 32 weight percent 1-octanol based on total weight is sealed in a mild steel canister and placed in a conventional electric freezer until solidified. The steel canister is placed in an insulated box with perishable fresh cut flowers. The flowers are maintained at about 5° C. for several hours.

EXAMPLE 3

The dibasic ester, dimethyl adipate (DMA) with a melting temperature of 10° C. is combined in percentages ranging from 0 to 100 weight percent with 1-dodecanol which has a melting temperature of 23.5° C. The thermal profiles of these various compositions are studied using the methods of Example 1. Eutectics are observed at about 35 weight percent DMA; about 50 weight percent DMA; and about 60 weight percent DMA, all melting at about 20°±1° C.; and about 94 weight percent DMA, 8.7° C. wherein the weight percentages are based on total sample weight. A PCM containing 50 weight percent DMA, 50 weight percent 1-dodecanol based on total weight is sealed in a polyethylene bottle and placed outdoors on a night when the temperature decreased to 8° C. The PCM solidified and is placed in a greenhouse chamber. The temperature of the greenhouse chamber under infrared radiation did not exceed 26° C. while solid PCM persisted. An identical greenhouse chamber without a PCM reaches a terminal temperature of 35° C. over the same duration.

EXAMPLE 4

The dibasic ester, dimethyl succinate (DMS) with a melting temperature of 17° C. is combined in percentages ranging from 0 to 100 weight percent with 1-dodecanol which has a melting temperature of 23.5° C. The thermal profiles of these various compositions are studied using the methods of Example 1. Several eutectics are observed including a global minimum eutectic at about 97 weight percent DMS, 16.4° C. wherein the weight percentage is based on total sample weight. A PCM containing 97 weight percent DMS, 3 weight percent 1-dodecanol based on total weight is sealed in a polyethylene bottle and placed outdoors on a night when the temperature decreased to 8° C. The PCM solidified and is placed in a greenhouse chamber. The temperature of the greenhouse chamber under infrared radiation does not exceed 25° C. while solid PCM persisted. An identical greenhouse chamber without a PCM reaches a terminal temperature of 35° C. over the same duration.

EXAMPLE 5

The dibasic ester, diethyl adipate (DMA) with a melting temperature of 10° C. is combined in percentages ranging from 0 to 100 weight percent with oleic (cis-9-octadecenoic) acid which has a melting temperature of 16.3° C. The thermal profiles of these various compositions are studied using the methods of Example 1. Eutectics are observed at about 98 weight percent DMA, 8.8° C.; about 92 weight percent DMA, 8.2° C.; about 87 weight percent DMA, 8.2° C.; about 66 weight percent DMA, 6.3° C.; about 58 weight percent DMA, 5.1° C.; about 40 weight percent DMA, 3.8° C.; and about 10 weight percent DMA, 0.1° C. wherein the weight percentages are based on total sample weight. Two kilograms (kg) of PCM containing 87 weight percent DMA, 13 weight percent oleic acid based on total weight is sealed in a hollow cement block and placed in a conventional electric freezer until solidified. The cement block is placed in a greenhouse chamber. The temperature of the greenhouse chamber under infrared radiation does not exceed 22° C. while solid PCM persisted. An identical greenhouse chamber without a PCM reaches a terminal temperature of 35° C. over the same duration.

EXAMPLE 6

The dibasic ester, dimethyl succinate (DMS) with a melting temperature of 17° C. is combined in percentages ranging from 0 to 100 wt percent with oleic (cis-9-octadecenoic) acid which has a melting temperature of 16.3° C. The thermal profiles of these various compositions are studied using the methods of Example 1. Eutectics are observed at about 86 weight percent DMS, 16° C.; about 74 weight percent DMS, 14.8° C.; about 57 weight percent DMS, 15.7° C.; about 40 weight percent DMS, 16.4° C.; and about 5 weight percent DMS, 0.1 ° C. wherein the weight percentages are based on total sample weight. Two kilograms (kg) of PCM containing 87 weight percent DMS, 13 weight percent oleic acid based on total weight is poured into an alumina crucible and placed in an ice bath until solidified. The crucible is placed in a greenhouse chamber. The temperature of the greenhouse chamber under infrared radiation does not exceed 28° C. while solid PCM persisted. An identical greenhouse chamber without a PCM reaches a terminal temperature of 35° C. over the same duration.

EXAMPLE 7

The dibasic ester, dimethyl adipate (DMA) with a melting temperature of 10° C. is combined in percentages ranging from 0 to 100 weight percent with lauric acid which has a melting temperature of 44° C. The thermal profiles of these various compositions are studied using the methods of Example 1. Several eutectics are observed including eutectic at about 96 weight percent DMA, 10° C. wherein the weight percentage is based on total sample weight.

EXAMPLE 8

The dibasic ester, dimethyl succinate (DMS) with a melting temperature of 17° C. is combined in percentages ranging from 0 to 100 weight percent with lauric acid which has a melting temperature of 44° C. The thermal profiles of these various compositions are studied using the methods of Example 1. Several eutectics are observed including eutectic at about 97 weight percent DMA, 17.2° C. wherein the weight percentage is based on total sample weight.

EXAMPLE 9

The dibasic ester, dimethyl succinate (DMS) with a melting temperature of 17° C. is combined in percentages ranging from 0 to 100 weight percent with polyethylene glycol having an average molecular weight of 900 and a melting temperature of about 32° C. The thermal profiles of these various compositions are studied using the methods of Example 1. A eutectic is observed at about 60 weight percent DMS, 12.6° C. wherein the weight percentage is based on total sample weight.

EXAMPLE 10

The dibasic ester, dimethyl succinate (DMS) with a melting temperature of 17° C. is combined in percentages ranging from 0 to 100 weight percent with polyethylene glycol having an average molecular weight of 600 and a melting temperature of about 22° C. The thermal profiles of these various compositions are studied using the methods of Example 1. A eutectic is observed at about 43 weight percent DMS, 4.5° C. wherein the weight percentage is based on total sample weight.

EXAMPLE 11

A box is constructed from hollow, rectangular polycarbonate panels having a cavity width of about 1 cm. The panels are sealed with greater than 98 percent of the panel filled with equivalent volumes of dimethyl adipate and a calcium chloride hexahydrate based PCM. A J-type thermocouple is mounted so as to monitor the temperature in the center of the box. A second J-type thermocouple monitors the temperature 5 cm exterior to the box. The box is allowed to equilibrate at 20° C. until both interior and exterior thermocouples read this value. The box is then placed in a conventional freezer. While the exterior thermocouple reads a value of −9° C., the interior temperature remained above 9° C. for several hours. The box is then transferred to an oven. While the exterior thermocouple reads a value of 40° C., the interior temperature remained below 28° C. for several hours.

What is claimed is:

1. A process for moderating the temperature of a body, comprising the step of:
    contacting said body with a non-compartmentalized container enclosing a mixture of at least two phase change materials each having a melting temperature,
    the first phase change material comprising a dibasic ester of the formula ROOC—$(CH_2)_n$—COOR' wherein R is a group containing $C_{1-8}$, R' is a group containing $C_{1-8}$ and n is a number from 2 to 10;
    the second phase change material being selected from the group consisting of water, calcium chloride hexahydrate, magnesium chloride hexahydrate, calcium bromide hexahydrate, magnesium nitrate hexahydrate and eutectics formed by combining two or more thereof,
    under conditions such that the temperature of said body is controlled between the melting temperatures of first and second phase change materials.

2. The process of claim 1 wherein said first phase change material comprises a dimethyl or diethyl ester.

3. The process of claim 1 wherein said first phase change material has a melting temperature between 5° C. and 35° C.

4. A process for controlling the temperature of a body, comprising the steps of:
    (A) providing a closed container containing a phase change material comprising;
        (1) a dibasic ester of the formula ROOC—$(CH_2)_n$—COOR', wherein R is a group containing $C_{1-8}$ R' is a group containing $C_{1-8}$, and n is a number from 2 to 10, and
        (2) a compound miscible with said dibasic ester at the relative proportions present and not reactive therewith, selected from the group consisting of:
            (a) an alcohol of the formula R"OH wherein R" is selected from the group consisting of: an aliphatic of less than 20 carbon atoms, an aryl of less than 18 carbon atoms optionally substituted with at least one $C_{1-4}$ containing group;
            (b) water;
            (c) a carboxylic acid having a pKa of greater than about 10; ad (d) a polymeric material having a molecular weight of less than about 5000;

wherein said phase change material is at a temperature equal to or below the melting temperature of the phase change material.

(B) contacting said closed container with a body having a temperature above the melting temperature of said phase change material.

(C) allowing said body to remain in contact with said closed container under conditions such that heat is transferred to said phase change material from said body at least until said phase change material undergoes a reversible melt, (D) then exposing said closed container to an environment at a temperature below the melting temperature of the phase change material source such that heat is transferred to said environment, the temperature of said phase change material is decreased to below said melting temperature and said phase change material undergoes a reversible freeze.

5. The process of claim 4 wherein the phase change material has a melting temperature between 5° C. and 35° C.

6. The process of claim 4 wherein R and R' are both identical and either methyl, ethyl or butyl.

7. The process of claim 4 wherein R is a methyl group, R' is a methyl group and n is two, three or four.

8. The process of claim 4 wherein said miscible compound is a carboxylic acid selected from the group consisting of: decanoic, lauric, myristic, palmitic, stearic, oleic, linoleic and linolenic acids.

9. The process of claim 8 wherein said dibasic ester is dimethyl succinate and said carboxylic acid is oleic acid, said ester and said acid each present in an amount sufficient to produce a phase change material with a melt temperature of between −1° and +9° C.

10. The process of claim 8 wherein said dibasic ester is dimethyl adipate and said carboxylic acid is oleic acid, said ester and said acid each present in an amount sufficient to produce a phase change material with a melt temperature of between −1° and +19° C.

11. The process of claim 8 wherein said dibasic ester is dimethyl succinate, dimethyl glutarate or dimethyl adipate, and said carboxylic acid is oleic acid.

12. The process of claim 4 wherein said body is a heat transfer fluid or air.

13. A process for controlling the temperature of a body, comprising the steps of:

(a) providing a closed container containing a phase change material comprising
  (i) a dibasic ester of the formula ROOC—$(CH_2)_n$—COOR', wherein R is a group containing $C_{1-8}$ R' is a group containing $C_{1-8}$ and n is a number from 2 to 10, and
  (ii) a compound miscible with said dibasic ester at the relative proportions present and not reactive therewith, selected the group consisting of:
    (1) an alcohol of the formula RΔOH wherein RΔ is selected from the group consisting of: an aliphatic of less than 20 carbon atoms, an aryl of less than 18 carbon atoms optionally substituted with at least one C1-4 containing group;
    (2) water;
    (3) a carboxylic acid having a pKa of greater than about 10; and
    (4) a polymeric material having a molecular weight of less than about 5000;

wherein said phase change material is at a temperature equal to or above the melting temperature of the phase change material (b) contacting said closed container with a body having a temperature below the melting temperature of said phase change material;

(c) allowing said body to remain in contact with said closed container under conditions such that heat is transferred from said phase change material to said body at least until said phase change material undergoes a reversible freeze, (d) then exposing said closed container to a heat source such that heat is transferred from said heat source to said phase change material and said phase change material undergoes a reversible melt.

14. The process of claim 13 wherein R and R' are both identical and are methyl, ethyl or butyl.

15. The process of claim 13 wherein R is a methyl group, R' is a methyl group and n is two, three or four.

16. The process of claim 13 wherein the phase change material has a melting temperature between 5° C. and 35° C.

17. The process of claim 13 wherein said body is a heat transfer fluid or air.

18. The process of claim 13 wherein in step (c) heat source is electrical resistive heating, solar radiation, microwave radiation or an exothermic chemical reaction.

* * * * *